Patented June 25, 1935

2,005,946

UNITED STATES PATENT OFFICE 2,005,946

METHOD OF MAKING ACETALDEHYDE

Russell W. Millar, Berkeley, and Leo V. Steck, Oakland, Calif., assignors to Shell Development Company, San Francisco, Calif., a corporation of Delaware No Drawing. Application November 2, 1931, Serial No. 572,732

10 Claims. (Cl. 260—139)

The invention relates to the production of acetaldehyde from acetylene by hydration and more particularly is concerned with the execution of such process in the presence of a liquid catalyst containing free acid and the corresponding acid salt of an alkali-metal or of ammonia.

It is well known that acetaldehyde can be prepared commercially from acetylene and water by the action of mercury salts as catalysts. A drawback to this process lies in the ease with which the mercury salt is reduced to the metallic state, and this rate of reduction depends upon the specific mercury salt used and the acidity and temperature of the solution in which it is dissolved.

Some reduction of mercury compounds to metallic mercury takes place in dilute acid solutions, and there is also a tendency for the acetaldehyde to form undesirable condensation products. With higher concentrations of acid there is a decrease in the reduction of the mercury catalyst but an increase in the quantity of acetaldehyde destroyed.

In sulfuric acid of less than 20% concentration the catalyst is always reduced to metallic mercury with objectionable rapidity, on reaction with acetylene. The ratio of acetaldehyde formed to mercury salt reduced is accordingly very low in such a solution. With sulfuric acid in concentrations above 20% the acetaldehyde cannot be distilled over at ordinary pressure without the formation of large quantities of crotonaldehyde and tarry by-products.

We have found that, if the reaction is carried out in the presence of a liquid catalyst containing the mercury catalyst, free acid and the corresponding acid salt of an alkali-metal or of ammonia the presence of both free acid and the corresponding acid salt increases the speed of reaction, facilitates the elimination of the acetaldehyde and preserves the catalyst from too rapid reduction. The acid salt in the free acid exerts a buffer effect, prolonging the activity of the catalyst and preventing the precipitation of sludge.

The results obtained by our process were rather surprising since it appears that the presence of free hydrogen ions enhances the effect of acid salt and vice versa, resulting in a conjunctive effect greater than that attributable to the sum total individual effects of free acid and acid salt. This result was not to be comprehended from a reading of the prior art as prior investigators who have used aqueous solutions containing acid salts were desirous of avoiding the presence of free hydrogen ions in their catalytic solutions. What is more surprising is that no heavy-metal salts are necessitated in applying our process.

It may well be that the acid salt salts out any paraldehyde formed and thereby enhances the absorptive effect of the free acid as well as diminishes the condensing effect of said free acid but we do not wish to regard ourselves as limited to any expression of theory as concerns the advantageous results obtained by our process.

The acetylene can be treated in a diluted state, that is mixed with methane or its homologues, ethylene or its homologues, CO, $CO_2$, $N_2$, $O_2$ air, steam or the like or can be treated in a relatively pure state by concentrating a gaseous mixture containing the same by absorption in a solvent and evaporation therefrom. However, we have found that the catalytic solution works more smoothly with relatively concentrated acetylene than with diluted acetylene. Mixtures containing from 40% to 99+% acetylene can be handled with ease by our process.

The catalyst proper may comprise mercury oxide or any mercury salt dissolved or suspended in its corresponding acid such as mercuric sulfate in sulfuric acid, mercury phosphate in phosphoric acid, mercuric perchlorate in perchloric acid, mercuric fluoborate in fluoboric acid, mercuric sulfonates of the aromatic series in sulfonic acids and the like or may comprise the acid salts of mercury dissolved or suspended in their corresponding acids. For purposes of economy and efficiency we prefer to utilize a solution of mercury sulfate in dilute sulfuric acid as we have found that under such conditions the amount of mercury reduced per pound of aldehyde formed is comparatively small although it is to be understood that the above mentioned combinations can be employed with varying degrees of practical efficiency.

The catalytic solution is preferentially saturated with the acid salt because reduction of mercury takes place more readily in dilute solutions, and it is best to have an excess of undissolved acid salt in the apparatus in order to saturate rapidly any water that may be added from time to time. However the quantity of acid salt added can be varied within wide limits depending on the particular operating conditions such as the temperature employed, the type and amount of mercury compound utilized, the character and strength of acid used etc.

The process can be carried out at relatively low temperatures under superatmospheric pressures or under atmospheric pressure at a temperature ranging from 50° to 100° C., preferably in the neighborhood of 65° to 80° C. Where low temperatures from 15° to 50° C. are employed for the absorption of acetylene in the catalytic solution, the temperature may be subsequently raised to split off the acetaldehyde and accomplish its distillation. When the temperature of the bath is maintained at from 65° to 80° C. under atmospheric pressure, the acetaldehyde continuously distills off.

The water needed in the reaction can be partially supplied by using moist acetylene, that is acetylene, either pure or diluted, accompanied by water vapor but more water must be added as often as the amount in the apparatus diminishes. It is better to add the water in small amounts and with thorough mixing, as a sudden dilution causes a sudden and notable hydrolysis of the soluble mercury salt to insoluble basic salts.

An illustrative example of the process is as follows: A liter of $H_2SO_4$ of about 6% strength, about 3 gm. of $H_gO$ and about 300 gm. of $NaHSO_4$ were mixed in a vessel provided with a stirrer, cooling device and a receiver and through this liquid mixture a strong acetylene current was passed which carried along with it the acetaldehyde produced. The temperature of operation was about 70° C., the pressure being atmospheric. Overall yields of 96% were attained for the three steps of (1) hydration of the acetylene, (2) recovery of the acetaldehyde as an aqueous solution, and (3) distillation with the production of 99.5% acetaldehyde.

If desired the acid salt and mercury compound may be jointly dissolved in either the same acid or in separate portions of the same and introduced downwardly in a column equipped with agitating means or preferably packed with porous rings or the like. The acetylene or a mixture containing the same is introduced at the bottom of the column under sufficient space velocity to carry the acetaldehyde formed out of the system through an opening in the upper portion of the column. A circulating pump may be employed to return the catalytic liquor from the bottom of the column to the top thereof. Water may be continuously or intermittently introduced in the pumping system either before the pump inlet or after the outlet thereof, the aqueous feed being equivalent to the amount of water removed from the system as such and as combined with the acetylene. Under atmospheric pressure, the operating temperature is preferably between 65° to 80° C. although it is to be understood that with increased pressures, lower temperatures may be employed.

The catalytic liquor as described possesses a long life and high capacity as compared to a catalyst in the form of a paste which does not contain any free acid.

The term "solution" wherever it occurs in the claims is intended to convey a physical state wherein the contained agent is completely absorbed by the solvent or free acid or is maintained therein in a finely divided state as a suspension.

It is to be understood that various modifications of procedure and substitutions of materials may be made within the scope of the invention but that such modifications and substitutions are to be considered as comprehended by the above disclosure and included within the terms of the following claims.

We claim as our invention:

1. The process of preparing acetaldehyde from acetylene which comprises hydrating acetylene with an acid solution containing free acid of less than 20% strength and not substantially less than 22.4%, by weight of an acid salt of the free acid employed with a member of the class consisting of alkali-metals and ammonia in the presence of a mercury compound.

2. The process of preparing acetaldehyde from acetylene which comprises hydrating acetylene with an acid solution containing free sulfuric acid of less than 20% strength and not substantially less than 22.4% by weight of an acid salt of the free acid employed with a member of the class consisting of alkali-metals and ammonia in the presence of a mercury compound of relatively low concentration.

3. The process of preparing acetaldehyde from acetylene which comprises hydrating acetylene with an acid solution containing free sulfuric acid of less than 20% strength and a substantial proportion of an acid salt of the free acid employed with a member of the class consisting of alkali-metals and ammonia in the presence of a mercury compound of relatively low concentration.

4. The process of preparing acetaldehyde from acetylene which comprises hydrating acetylene with an acid solution containing free acid of less than 20% strength and which is substantially saturated with respect to an acid salt of the free acid employed with a member of the class consisting of alkali-metals and ammonia in the presence of a mercury compound of relatively low concentration.

5. The process of preparing acetaldehyde from acetylene which comprises hydrating acetylene with an acid solution containing substantially less than 6% by weight of free acid and a substantial proportion of an acid salt of the free acid employed with a member of the class consisting of alkali-metals and ammonia in the presence of a mercury compound of low concentration.

6. The process of preparing acetaldehyde from acetylene which comprises hydrating acetylene with an acid solution containing substantially less than 6% by weight of free acid and which is substantially saturated with respect to an acid salt of the free acid employed with a member of the class consisting of alkali-metals and ammonia in the presence of a mercury compound of relatively low concentration.

7. The process of preparing acetaldehyde from acetylene which comprises hydrating acetylene with an acid solution containing substantially less than 6% by weight of free acid and a substantial proportion of an acid salt of the free acid employed with a member of the class consisting of alkali-metals and ammonia in the presence of less than 0.5% by weight of a mercury compound (calculated as HgO).

8. The process of preparing acetaldehyde from acetylene which comprises hydrating acetylene with an acid solution containing free acid and a mercury compound (calculated as HgO) in the ratio of about 21:1, by parts by weight, the solution containing substantially less than 6% by weight of free acid and a substantial proportion of an acid salt of the free acid employed with a member of the class consisting of alkali-metals and ammonia.

9. The process of preparing acetaldehyde from acetylene which comprises hydrating acetylene with an acid solution containing free acid and a mercury compound (calculated as HgO) in the ratio of about 21:1, by parts by weight, the solution containing substantially less than 6% by weight of free acid and a substantial proportion of an acid salt of the free acid employed with a member of the class consisting of alkali-metals and ammonia, the solution containing at least 100 parts by weight of acid salt per part by weight of mercury compound.

10. The process of preparing acetaldehyde from acetylene which comprises hydrating acetylene with an acid solution containing free acid of less than 20% strength and a substantial proportion of an acid salt of the free acid employed with a member of the class consisting of alkali-metals and ammonia, the solution containing substantially not less than 4.8 parts by weight of acid salt per part by weight of free acid, in the presence of a mercury compound of relatively low concentration.

RUSSELL W. MILLAR.
LEO V. STECK.